United States Patent [19]

Wendel

[11] 3,876,752

[45] Apr. 8, 1975

[54] MANUFACTURE OF STRONG NITRIC ACID

[75] Inventor: Martin Maurice Wendel, Glen Mills, Pa.

[73] Assignee: E. I. du Pont de Nemours and Company, Wilmington, Del.

[22] Filed: Aug. 28, 1972

[21] Appl. No.: 284,138

Related U.S. Application Data

[63] Continuation-in-part of Ser. No. 63,562, Aug. 13, 1970, abandoned, which is a continuation-in-part of Ser. No. 733,406, May 31, 1968, abandoned.

[52] U.S. Cl.................................. 423/392; 423/394
[51] Int. Cl............................................ C01b 21/40
[58] Field of Search..................... 423/392, 393, 394

[56] References Cited
UNITED STATES PATENTS

| | | | |
|---|---|---|---|
| 1,948,968 | 2/1934 | Kramer............................ | 423/392 |
| 2,088,057 | 7/1937 | Handforth........................ | 423/392 |

FOREIGN PATENTS OR APPLICATIONS

| | | | |
|---|---|---|---|
| 456,518 | 11/1956 | United Kingdom................ | 423/392 |
| 910,131 | 11/1962 | United Kingdom................ | 423/394 |
| 342,068 | 1/1931 | United Kingdom................ | 423/394 |

OTHER PUBLICATIONS

Miles; *Nitric Acid Manufacture and Use*, Oxford Univ. Press, London, 1961, pp. 12–13, 33–34, 49–51, and 54.

*Primary Examiner*—G. O. Peters

[57] ABSTRACT

Nitric acid having a strength of about 90 to 100% $HNO_3$, by weight, is prepared by countercurrently absorbing gaseous nitrogen peroxide in cold, strong nitric acid whose concentration is about from 75 to 85% $HNO_3$, by weight, thereby forming a true solution of the strong acid and nitrogen peroxide; reacting the true solution with molecular oxygen and water at high pressure, thereby increasing the concentration of the strong acid, while recovering nitrogen peroxide desorbed from the solution during the reaction; vaporizing a portion of the solution to recover unreacted nitrogen peroxide; recycling this nitrogen peroxide and that recovered from the reaction step to the absorption step; and distilling the strong acid at about atmospheric pressure to give as distillate the strong nitric acid product, thereby leaving as bottoms the strong acid used to absorb nitrogen peroxide in the first step.

15 Claims, 2 Drawing Figures

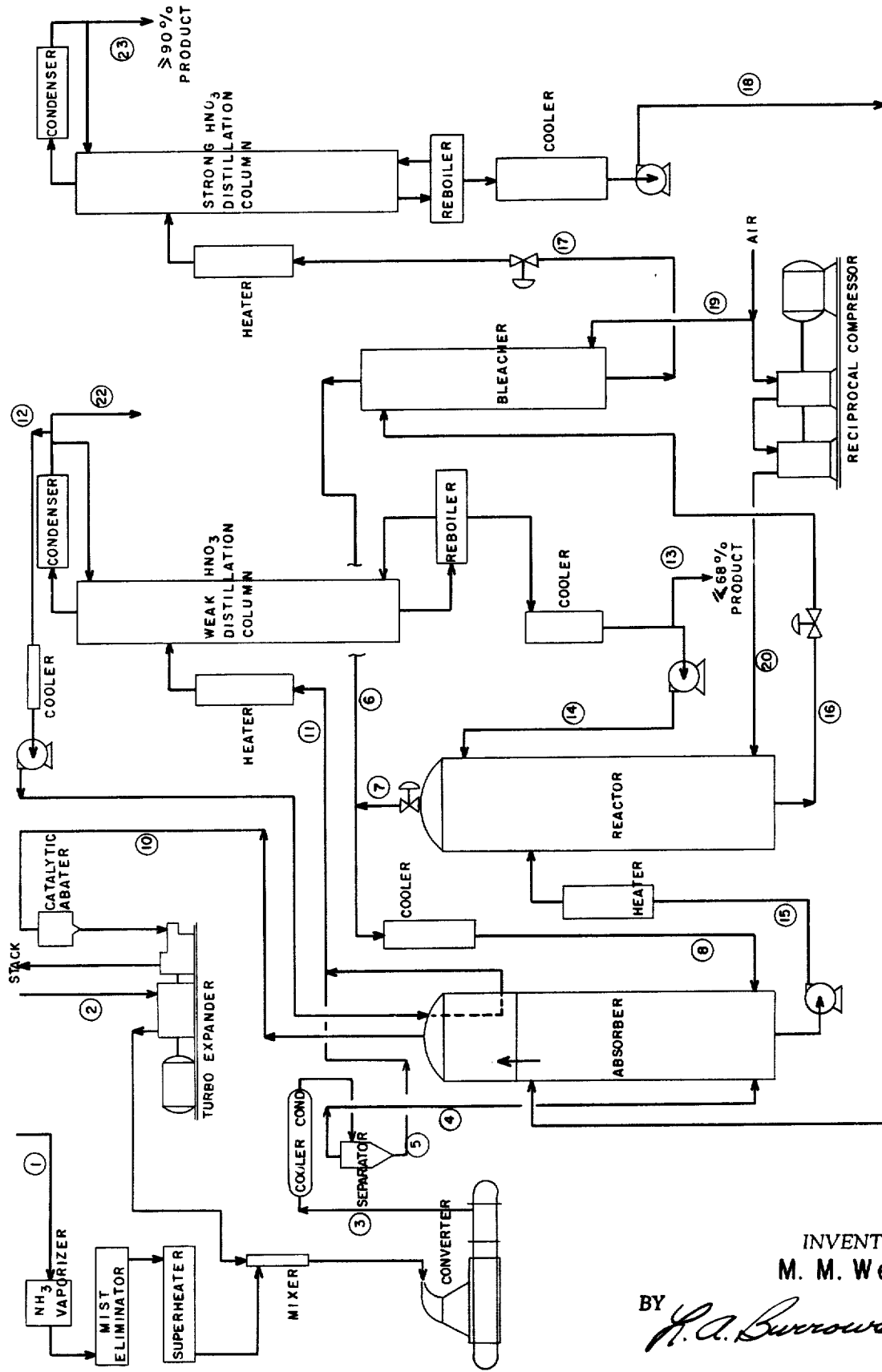
FIGURE I

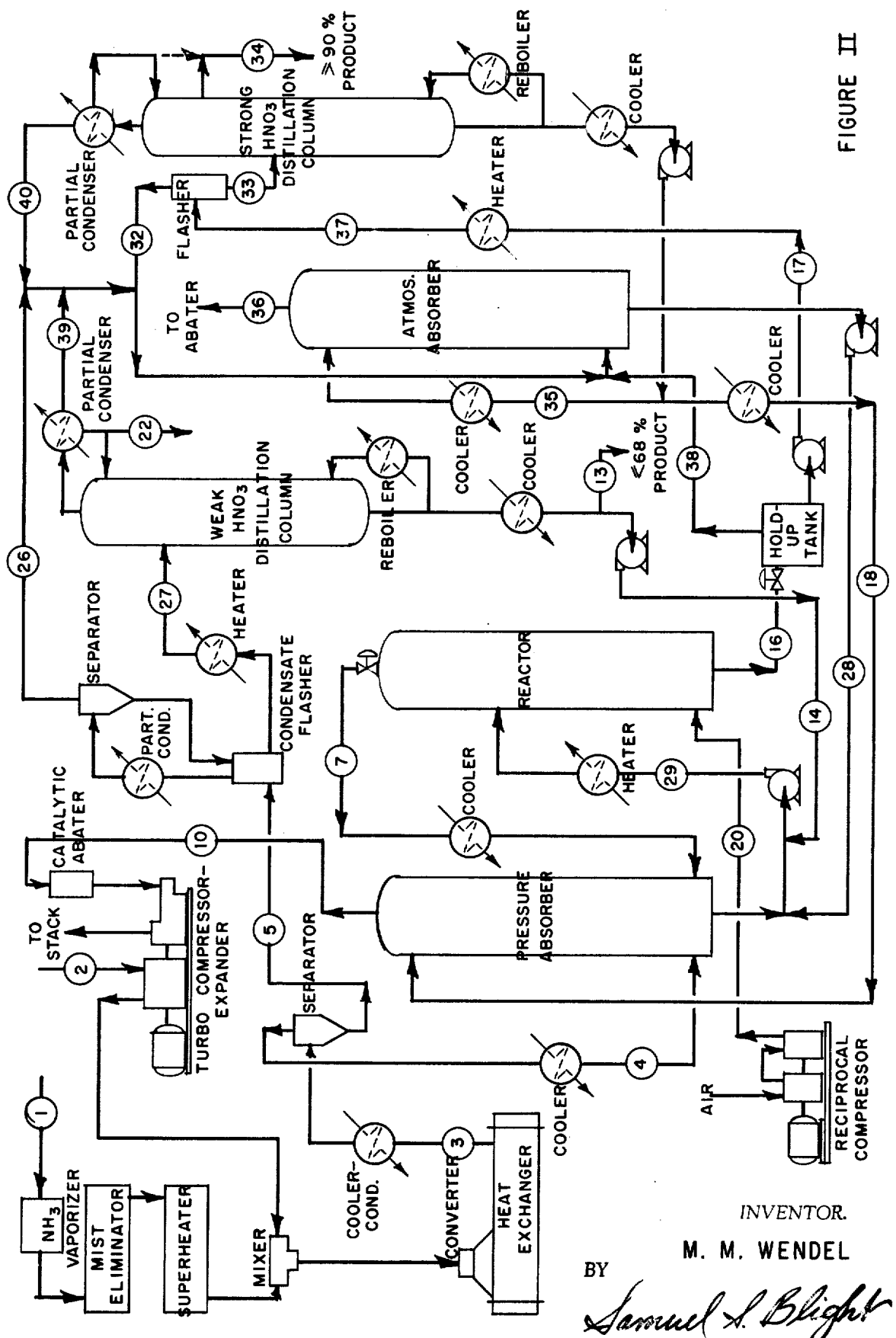
FIGURE II

MANUFACTURE OF STRONG NITRIC ACID

BACKGROUND OF THE INVENTION

This invention relates to a process for directly preparing strong nitric acid having a concentration of about from 90 to 100% $HNO_3$, by weight. This application is a continuation-in-part of my copending application Ser. No. 63,562, filed Aug. 13, 1970, which in turn is a continuation-in-part of my copending application Ser. No. 733,406 filed in May 31, 1968 both now abandoned.

As used herein, "nitrogen peroxide" denotes the equilibrium of $NO_2$ and $N_2O_4$. All concentrations hereinafter referred to are weight percent unless otherwise specifically indicated, and the nitric acid concentrations are on a nitrogen peroxide-free basis.

Although most nitric acid currently produced has a concentration less than about 68% $HNO_3$, there is a substantial need for stronger acid, particularly for acid whose concentration is in the about 90–100% $HNO_3$ range. Such acid is used, for example, in nitration reactions such as in the preparation of explosives, dyestuffs and biochemicals. However, since nitric acid and water form a constant boiling mixture (azeotrope) between about 68 and 69% $HNO_3$, more concentrated acid cannot be directly prepared by distillation. Accordingly, commercial processes had to be developed, which would circumvent the problem created by the azeotrope. Several processes are being practiced in the industry. For example, strong nitric acid is being made by extractive distillation with sulfuric acid; by modifying the azeotropic composition with magnesium nitrate and then distilling the resultant mixture; and by separating liquid nitrogen tetraoxide from a mixture of nitrogen oxides for subsequent reaction with weak $HNO_3$, e.g., as in the Bamag and Fauser processes. None of these methods, however, is completely satisfactory from an economic standpoint, and those which produce strong nitric acid most economically are inflexible in the sense that they cannot simultaneously prepare nitric acid of less than about 68% concentration when desired.

U.S. Pat. No. 2,088,057 - Handforth (1937), assigned to the assignee of the present invention, concerns a process for making nitric acid wherein first the water is removed from ammonia oxidation reaction products without removing nitric acid values, and then the remaining gases are reacted with water and oxygen and absorbed at substantially the same pressures, such as 50 atmospheres, to produce nitric acid. The removal of the water involves expenses which would be desirable to be able to avoid.

British Pat. No. 456,518 - Davies (1936) uses an ammonia oxidation converter at low pressure, such as atmospheric pressure, and pumps up the nitrogen-oxide-containing gases to elevated pressures for reaction with air or oxygen in a multistage column to produce nitric acid. The operation of the ammonia converter at atmospheric pressure facilitates removal of water to permit the nitric acid production, but pumping up the pressure of such corrosive gases is difficult and costly compared to increasing the pressure of liquids. Davies also uses acid with a concentration of over 90% to produce more acid of that same strength. Ordinary stainless steel materials of construction are subject to corrosion in such acids at the recommended temperatures, and modern practice requires more expensive or less versatile materials for these applications.

Thus, there is a need for an improved process that will permit preparation of concentrated nitric acid at a lower mill cost, avoiding disadvantages of the prior art and providing flexibility heretofore lacking in commercial operations.

SUMMARY OF THE INVENTION

This invention provides an improved direct process for the production of nitric acid having a concentration of about 90 to 100% $HNO_3$, and optionally for the simultaneous production of aqueous nitric acid having a concentration of about from 55 to 68% $HNO_3$. The improvement resides in a combination of process steps which makes judicious use of process water and nitrogen peroxide, thus effecting substantial savings in the mill cost of the concentrated acid, while permitting, but not requiring in all cases, the simultaneous direct production of nitric acid of less than azeotropic composition. In particular, the process of this invention comprises continuously:

a. countercurrently absorbing gaseous nitrogen peroxide in aqueous nitric acid bottoms from step (e) at a temperature and pressure of about from 0° to 25°C. and 80 to 120 psig, respectively, thereby forming a true solution of the aqueous nitric acid having a concentration of about from 75 to 85% $HNO_3$ on a nitrogen peroxide free basis and about from 15 to 30% dissolved nitrogen peroxide, based on the total weight of the solution;

b. reacting the true solution of step (a) with molecular oxygen and water at a temperature in the range of about 40° to 100°C. and a pressure in the range of about 300 to 1,600 psig, thereby increasing the concentration of the aqueous nitric acid of step (a) to about 80 to 90% $HNO_3$, while recovering gaseous nitrogen peroxide desorbed from the true solution during the reaction and recycling the gaseous peroxide to be absorbed in step (a);

c. vaporizing a portion of the aqueous nitric acid stream from step (b) to remove at least 50% of the nitrogen peroxide contained therein;

d. absorbing the nitrogen peroxide obtained in step (c) in a portion of the bottoms from step (e); and e. distilling the aqueous nitric acid from step (c) at about atmospheric pressure and recovering as distillate strong nitric acid having a concentration of about from 90 to 100% $HNO_3$, leaving as bottoms aqueous nitric acid having a concentration of about from 75 to 85% $HNO_3$, respectively;

and optionally, individually or collectively, g. scrubbing the gaseous effluent from absorption step (a) with water to recover unabsorbed gaseous nitrogen peroxide and $HNO_3$ vapor as weak nitric acid;

h. distilling the weak acid from step (g), or the aqueous nitric condensate having a concentration of less than about 55% $NHO_3$, or both together, to give as distillate aqueous nitric acid having a concentration below about 5% $HNO_3$ and as bottoms aqueous nitric acid having a concentration of about from 55 to 68.5% $HNO_3$;

i. feeding at least a portion of the bottoms from step (h) to step (b) to serve as the source of said water;

j. feeding at least a portion of the distillate from step (h) to step (g) to serve as a source of said water.

The term "vaporization" as used herein refers to a unit operation wherein dissolved nitrogen peroxide is removed from a liquid as, for example, by bleaching where the peroxide is stripped from the liquid or by flashing.

The foregoing steps of absorption (a), high-pressure reaction (b), vaporization (c), and distillation (e) are the nucleus of the process of this invention and give it the desired flexibility. Recovering nitrogen peroxide as in steps (b) and (d) and recycling this nitrogen peroxide to absorption step (a) and recycling the original absorbent from the distillation step (bottoms) to the absorption step are procedures designed to improve the economics of the process. Additional economics may be realized by employing preferred process steps hereinafter described.

By its unique combination of steps, especially in the more preferred embodiments, the present invention offers substantially improved economics by enabling better materials balances and more efficient energy utilization. All of the water used can be from the catalytic oxidation of ammonia which avoids stress-corrosion-causing chlorine found in many water supplies. Also, nitric acid produced according to the invention does not contain sulfates or magnesium salts found in strong nitric acid produced traditionally by extractive distillation using sulfuric acid or magnesium nitrate, respectively.

BRIEF DESCRIPTION OF THE DRAWING

FIGS. 1 and 2 of the accompanying drawings illustrate flow diagrams for two complete preferred embodiments of the process of the present invention.

DETAILED DESCRIPTION OF THE INVENTION

To facilitate understanding of the interrelationship among the various steps of the present process, it will first be described with reference to the complete preferred embodiments shown on the drawings, and thereafter, other embodiments will be discussed.

With reference to FIG. 1 ammonia from line 1 and air from line 2 are mixed and fed to a Converter where the ammonia is catalytically oxidized with oxygen from the air. This ammonia oxidation step is conducted at elevated temperatures and pressures in a conventional manner, and preferably at a pressure slightly higher than is to be employed in the Absorber to allow for pressure drop between it and the Converter. Hot gaseous ammonia oxidation products from the Converter are fed (line 3) to the Cooler-Condenser wherein water of reaction is condensed and most nitric oxide (NO) is oxidized to nitrogen peroxide, while the temperature of the gas is maintained above the dew point of the nitrogen peroxide. The resulting two-phase mixture of gas and condensate, which will generally have a temperature of the order of about from 15° to 70°C., enters the Separator wherein condensate is separated from the gas phase as weak aqueous nitric acid and is fed (line 5) to the Weak $HNO_3$ Distillation Column. The Cooler-Condenser and Separator preferably are designed to permit removal of water of reaction with minimum absorption of nitrogen peroxide, but line 5 may contain acid having a strength as high as about 55% $HNO_3$. Conventional cooler-condenser and separator designs normally give a condensate stream whose strength is about from 35 to 45% $HNO_3$. The gaseous mixture leaving the Separator (line 4) is substantially anhydrous and contains about from 5 to 10% nitrogen oxides, by volume, balance mainly nitrogen and oxygen. This gaseous mixture is fed to the Absorber together with gaseous nitrogen peroxide recovered from the Reactor (line 7) and Bleacher (line 6). The two nitrogen peroxide-containing streams (4 and 8) mix in the Absorber to give a combined reaction gas containing about from 8 to 13%, and preferably about from 9 to 12%, nitrogen peroxide, by volume.

In this embodiment the Absorber is divided into two sections. In the lower section, which operates at about from 0° to 15°C. and about from 80 to 120 psig, a recycle absorbent stream (line 18) from the bottom of the Strong $HNO_3$ Distillation Column and containing about from 75 to 85% $HNO_3$ flows countercurrently to the ascending gas stream. By means of this counter-current flow, gaseous nitrogen peroxide is dissolved in the strong acid, thereby forming a true solution, and the nitrogen peroxide content of the combined reaction gas is reduced to below about 0.3%, and preferably below about 0.1%, by volume. Since the 75 to 85% $HNO_3$ used in the lower section of the Absorber has an $HNO_3$ vapor pressure of about $0.8 \pm 0.2$ psig, the gaseous effluent from this section is saturated with $HNO_3$. This $HNO_3$ and much of the remaining (undissolved) nitrogen peroxide are recovered by scrubbing the gaseous effluent with weak aqueous nitric acid (less than about 5% $HNO_3$) which is fed into the upper Absorber section from the Weak $HNO_3$ Distillation Column. At least about 45% of the nitrogen peroxide gas that enters the upper section of the Absorber is absorbed. Gases that leave the Absorber (line 10) are sent to conventional catalytic abatement units (where required), to power recovery units, and the like for ultimate stack disposal to the atmosphere. The acid from the upper section is added to the Cooler-Condenser condensate (line 5) to be fed through line 11 to the Weak $HNO_3$ Distillation Column. The about 75 to 85% $HNO_3$ stream that leaves the bottom of the Absorber contains about from 15 to 30% dissolved nitrogen peroxide. No liquid nitrogen peroxide phase is present, rather a true solution of nitrogen peroxide in $HNO_3$ exists.

The true solution prepared in the Absorber is pumped (line 15) through a heater to the Reactor which operates at about from 300 to 1,600 psig, preferably about at least 400 and not over 600 psig, and 40°C. to 100°C. In the Reactor, about 40 to 80%, prefereably $60 \pm 5\%$ of the nitrogen peroxide in solution is converted to $HNO_3$ by air oxidation according to the following reaction:

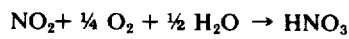

$$NO_2 + \tfrac{1}{4} O_2 + \tfrac{1}{2} H_2O \rightarrow HNO_3$$

Aqueous nitric acid containing about from 55 to 68% is fed from the bottom of the Weak $HNO_3$ Distillation Column (line 14) to the top of the Reactor to supply the water required for the above indicated reaction. The $NO_2$ required is, of course, provided by the dissolved nitrogen peroxide. The $O_2$ required for the reaction is supplied at Reactor pressure by air (line 20) from a reciprocal compressor, or the like. In the Reactor, the air ($O_2$) not only reacts with the dissolved nitrogen peroxide, but also strips unreacted nitrogen peroxide from the true solution. The aqueous $HNO_3$ stream that is fed (line 14) into the top of the Reactor reabsorbs some of the desorbed nitrogen peroxide and carries it back down into the lower part of the Reactor. The liquid effluent from the Reactor (line 16) contains about 85 ± 5% HNO₃ on a nitrogen peroxide-free basis and less than about 10% and preferably less than about 5% dissolved nitrogen peroxide. This dissolved nitrogen peroxide is removed by air (line 19) in a conventional stripping or bleaching operation in the Bleacher after the pressurized Reactor product stream is depressurized to about 130 ± 25 psig. Following this procedure substantially all remaining dissolved nitrogen peroxide is recovered. Off-gases from both the Bleacher and Reactor (lines 6 and 7) are combined (line 8) for recycle to the Absorber.

The strong aqueous nitric acid from the Bleacher, which contains about from 80 to 90% HNO₃, flows (line 17) to the Strong HNO₃ Distillation Column wherein it is distilled at approximately atmospheric pressure as a matter of operating convenience. The overhead from the Strong HNO₃ Distillation Column is the desired product containing about from 90 to 100% HNO₃ depending on the strength of acid distilled. This product is condensed and withdrawn through line 23. The bottoms which contain about from 75 to 85% HNO₃ are cooled and recycled (line 18) to the Absorber.

In the illustrated process, the fraction of total HNO₃ production that will be obtained as a sidestream product (line 13) containing about from 55 to 68% HNO₃ is determined primarily by the strength of the Cooler-Condenser condensate withdrawn from the Separator in line 5, higher strength condensate requiring sidestream product withdrawal of more of the weaker acid. For any given condensate strength, the ratio of concentrated HNO₃ production to the weaker sidestream production can be varied over a range of about 6.5/1 to 2/1 by using some of the condensate from the Condenser Cooler to supply part of the water needed for the Reactor.

Referring again to the Weak HNO₃ Distillation Column for more detailed consideration of its operation, condensate from the Separator and weak acid from the upper section of the Absorber are rectified into bottoms and distillate at a temperature of about from 110° to 121°C. (reboiler temperature) and about atmospheric pressure. The bottoms have a concentration of about from 55 to 68% HNO₃, preferably at least about 65% HNO₃ and the distillate has a strength less than about 5%, preferably less than 0.1% HNO₃. As previously indicated, at least part of the bottoms is fed to the Reactor through line 14 to supply the water required for reaction with oxygen and nitrogen peroxide. The distillate is split and used according to process demands for water. Part of the distillate is fed through line 12 to the Absorber as described above and the remainder is discharged from the system through line 22.

With reference to FIG. 2 an especially preferred embodiment of the present invention may be seen. The streams and equipment which are similar to those of FIG. 1 are numbered similarly. The stream (line 3) entering the Separator wherein condensate is separated from the gas phase as weak aqueous nitric acid is the same composition as in FIG. 1. The condensate is fed (line 5) to a Condensate Flasher operated at a temperature of about 100°C. and atmospheric pressure. The liquid from the Condensate Flasher is fed (line 27) to a Weak HNO₃ Distillation Column and the vapor is fed (line 26) to the Atmospheric Pressure Absorber. The Cooler-Condenser and Separator preferably are designed to permit removal of water of reaction with minimum absorption of nitrogen peroxide, but line 5 may contain acid having a strength as high as about 55% HNO₃. Conventional cooler-condenser and separator designs normally give a condensate stream whose strength is about from 35 to 45% HNO₃. The gaseous mixture leaving the Separator (line 4) is substantially anhydrous and contains about from 5 to 10% nitrogen oxides, by volume. This gaseous mixture is fed to the Pressure Absorber together with the gaseous nitrogen peroxide recovered from the Reactor (line 7). These two nitrogen peroxide-containing streams (lines 4 and 7) mix in the Pressure Absorber to give a combined reaction gas containing about from 8 to 13%, and preferably about from 9 to 12%, nitrogen peroxide, by volume.

The Pressure Absorber, which operates at about from 0° to 25°C. and about from 80 to 120 psig, receives a recycle absorbent stream (line 18) from the bottom of the Strong HNO₃ Distillation Column containing from about 75 to 85% HNO₃ which flows countercurrently to the ascending gas stream. By means of this countercurrent flow, gaseous nitrogen peroxide is dissolved in the strong acid, thereby forming a true solution, and the nitrogen peroxide content of the combined reactin gas is reduced to below about 0.3% and preferably below about 0.1%, by volume. Gases that leave the Pressure Absorber (line 10) are sent to conventional catalytic abatement units (where required), or to power recovery units and the like for ultimate stack disposal absorption. Optionally, these gase can be treated by to the atmosphere. Optionally, these gases can be treated by absorption in water or the weak HNO₃ overheads from the weak HNO₃ distillation column, such as in the manner shown in FIG. 1 but not in FIG. 2. The stream that leaves the bottom of the Pressure Absorber contains about from 15 to 30% dissolved nitrogen peroxide and 75 to 85% HNO₃. No liquid nitrogen peroxide phase is present, rather a true solution of nitrogen peroxide in HNO₃ exists.

The true solution prepared in the Pressure Absorber is combined with the bottoms from the Atmospheric Absorber (line 28), and the aqueous nitric acid containing 55 to 68% HNO₃ from the bottom of the Weak HNO₃ Distillation Column (line 14) and is pumped (line 29) through a heater to the Reactor which operates as stated hereinabove. The NO₂ required is, of course, provided by the dissolved nitrogen peroxide. The O₂ required for the reaction is supplied at Reactor pressure by air (line 20) from a reciprocal compressor, or the like. In the Reactor, the air (O₂) not only reacts with the dissolved nitrogen peroxide, but also strips unreacted nitrogen peroxide from the true solution. Some of the desorbed nitrogen peroxide is carried back down into the lower part of the Reactor by the feed stream (line 29). The liquid effluent from the Reactor (line 16) contains about 85 ± 5% % HNO₃ on a nitrogen peroxide-free basis and less than about 10% and preferably less than about 5% dissolved nitrogen peroxide. At least 50% of this dissolved nitrogen peroxide is removed by flashing the effluent from a pressure of 530 psig to atmospheric pressure into a holdup tank. Preferably, the effluent is subsequently heated (line 17) to about 74°C. and again flashed. The second flashing substantially removes the balance of the nitrogen peroxide and should be used when it is desired that the nitric acid product be clear and not fuming acid. The vapors from the Flasher are fed (line 32) to the Atmospheric Absorber. Substantially all of the dissolved nitrogen peroxide can be recovered in this manner.

The liquid from the Flasher is fed (line 33) to the Strong $HNO_3$ Distillation Column wherein it is distilled at approximately atmospheric pressure as a matter of operating convenience. The overheads from the Strong $HNO_3$ Distillation Column which are partially condensed and withdrawn through line 34 contain about from 90 to 100% $HNO_3$ depending on the strength of acid distilled. The bottoms which contain about from 75 to 85% $HNO_3$ are cooled, split into two streams (lines 18 and 35) one of which is recycled (line 18) to the Pressure Absorber and the other recycled to the Atmospheric Absorber in a ratio of approximately 5/1 respectively.

As in the process of FIG. 1 the fraction of total $HNO_3$ production that will be obtained as a sidestream product (line 13) containing about from 55 to 68% $HNO_3$ is determined primarily by the strength of the Cooler-Condenser condensate withdrawn from the Separator in line 5, higher strength condensate requiring sidestream product withdrawal of more of the weaker acid. For any given condensate strength, the ratio of concentrated $HNO_3$ production to the weaker sidestream production can be varied over a range of about 6.5/1 to 2/1 by using some of the condensate from the Cooler Condenser to supply part of the water needed for the Reactor. Approximately 1.5—2% of the condensate is vaporized in the Condensate Flasher and the vapors directed to the Atmospheric Absorber (line 26).

The Weak $HNO_3$ Distillation Column operates substantially as in FIG. 1 except that only the liquid from the Condensate Flasher (line 27) is rectified into bottoms and distillate at a temperature of about from 110° to 125°C. (reboiler temperature) and about atmospheric pressure. The bottoms have a concentration of about from 55 to 68% $HNO_3$, preferably at least about 65% $HNO_3$, and the distillate has a strength less than about 5%, preferably less than 0.1 % $HNO_3$. As previously indicated, at least part of the bottoms is fed to the Reactor through line 14 to supply the water required for reaction with oxygen and nitrogen peroxide. The distillate is used according to process demands for water, and the remainder is discharged from the system through line 22.

The Atmospheric Absorber receives vapors from various holdup tanks in the system, e.g., line 38, the partial condensers of the Strong and Weak $HNO_3$ Distillation columns, (lines 40 and 39), the Condensate Flasher-Separator (line 26) and the Strong $HNO_3$ Flasher (line 32). The liquid feed (line 35) is obtained from the bottoms of the Strong $HNO_3$ Distillation Column and the offgas is discarded after optional catalytic removal of the nitrogen oxides (line 36).

As previously indicated, the steps of absorption, reaction, vaporization and distillation of strong acid are fundamental to the process of this invention. For this reason their more important parameters are summarized and tabulated below for each process illustrated in FIGS. I and II. In the following tables, none of the values given are absolutes and therefore they should be prefaced with the word "about."

PROCESS EMPLOYING A BLEACHING OPERATION (FIG. I)

Absorption [Absorber]

| Item | Conditions Preferred | Conditions General |
|---|---|---|
| Lower Section | | |
| Absorbent | 79 to 80% $HNO_3$ | 75 to 85% $HNO_3$ |
| Pressure, psig | 100 ± 10 | 100 ± 20 |
| Temp. °C. | 3 to 10 | 0 to 15 |
| °F. | 37 to 50 | 32 to 59 |
| Vapor Pressure of Solvent $HNO_3$, psig | 0.8 ± 0.2 | 0.8 ± 0.2 |
| Upper Section | | |
| Absorbent | <0.1% $HNO_3$ | 0.05 to 5% $HNO_3$ |
| Pressure, psig | 95 ± 10 | 95 ± 20 |
| Temp., °C. | 20 ± 15 | 30 ± 30 |
| °F. | 41 to 95 | 32 to 140 |

Reaction [Reactor]

| | Conditions Preferred | Conditions General |
|---|---|---|
| Pressure, psig | 400 to 600 | 300 to 1600 |
| Temp., °C. | 60 ± 10 | 70 ± 30 |
| °F. | 122 to 158 | 104 to 212 |
| Conversion of $NO_2 \rightarrow HNO_3$, % | 60 ± 5 | 60 ± 20 |

Vaporization Bleaching [Bleacher]

| Item | Conditions Preferred | Conditions General |
|---|---|---|
| Means | air stripping | air or similar gas stripping like $N_2$, etc. |
| Pressure, psig | 115 ± 10 | 130 ± 25 |
| Temp., °C. | 60 ± 10 | 60 ± 30 |
| °F. | 122 to 158 | 86 to 194 |

Distillation [Strong $HNO_3$ Distillation Column]

| | Conditions Preferred | Conditions General |
|---|---|---|
| Feed in % $HNO_3$ | 85 ± 5 | 75 to 95 |
| Overhead, % $HNO_3$ | 95 minimun | 90 to 100 |
| Bottoms, % $HNO_3$ | 79 to 80 | 75 to 85 |
| Pressure, psig | 0 | 0 ± 5 |
| Temp., Bottom | 117 ± 3°C. 237°F. to 248°F. | 117 ± 3°C. 237°F. to 248°F. |
| Top | 88 to 100°C. 190°F. to 212°F. | 88 to 100°C. 190°F. to 212°F. |

PROCESS EMPLOYING FLASHING OPERATION (FIG. II)

Absorption [Pressure Absorber]

| Item | Conditions Preferred | Conditions General |
|---|---|---|
| Absorbent | 79 to 80% $HNO_3$ | 75 to 85% $HNO_3$ |
| Pressure, psig | 100± 10 | 100 ± 20 |
| Temp., °C. | 3 to 10 | 0 to 25 |

[Atmospheric Absorber]

| Item | Conditions Preferred | Conditions General |
|---|---|---|
| Absorbent | 79 to 80% $HNO_3$ | 75 to 85% $HNO_3$ |
| Pressure, psig | 0 to 5 | -.5 to ±15 |
| Temp., °C. | 3 to 10 | 0 to 25 |
| Reaction [Reactor] | Same as set forth above for the operation employing the bleachers. | |

Vaporization [Condensate Flasher Preceding Weak $HNO_3$ Distillation]

| Item | Conditions Preferred | Conditions General |
|---|---|---|
| Feed in % $HNO_3$ | 35 to 45 | less than 55 |
| Temp. °C. | 100 ± 5 | 100 ± 20 |

PROCESS EMPLOYING FLASHING OPERATION—Continued (FIG. II)

Absorption [Pressure Absorber]

| | Conditions | |
|---|---|---|
| Item | Preferred | General |
| Pressure, psig | 0 | 0 ± 5 |
| % by Weight Flashed [Flasher Preceding Strong HNO₃ Distillation] | 5 ± 1 | >3 |

| | Conditions | |
|---|---|---|
| Item | Preferred | General |
| Feed in % HNO₃ | 85 ± 5 | 75 to 95 |
| Temp., °C. | 75 ± 10 | 60 to 90 |
| Pressure, psig | 0 | 0 ± 5 |
| % by Weight Flashed | 4 ± 1 | 1 to 10 |

The nitrogen-peroxide fed to the Pressure Absorber through line 4 may be from any suitable source, although it preferably is provided by ammonia oxidation as discussed above. All that is required is that the nitrogen peroxide constitute at least about 5% of the feed gas, by volume, the remainder being substantially inert or the nitrogen peroxide precursors nitric oxide and oxygen. Minor amounts of entrained water may be present, but the nitrogen peroxide should be substantially anhydrous, e.g., contain less than about 1% water. When the nitrogen peroxide is provided by ammonia oxidation, it generally will be at a concentration no greater than about 10% and will have a state of oxidation of at least about 90%, i.e., at least about 90% of total nitrogen peroxide plus nitric oxide will be nitrogen peroxide.

The Absorbers may be any desired type of countercurrent scrubbing columns such as, for instance, those packed with chemical-ware rings, or they may be, and preferably are, towers containing a plurality of plates or trays fitted with cooling coils and bubble caps. The Reactor, too, may be of such construction; but, of course, must be of heavy-walled construction to withstand reaction pressures. Also, sieve plates can be employed instead of packing or bubble cap trays. Although countercurrent flow is not required in the Reactor, flow preferably will be as shown on the drawings, and through a column of the bubble cap type. The Bleacher and Strong and Weak HNO₃ Distillation Columns are of conventional design. Whereas Reboilers and Condensers are shown on the drawing for each distillation column, they may properly be considered part of the distillation columns themselves.

The source of water fed to the Reactor (line 14) is not critical to the process of the instant invention in its broader aspects. For example, part or all of such water could be the product stream from a conventional pressure process nitric acid plant, which would typically contain about 62 to 65% HNO₃. In this case, part of the condensate from the Cooler-Condenser (if any) could be fed to the absorption column of the referenced plant, the remainder being withdrawn from the system for use or distilled as shown on the drawing to give about a 55 to 68% HNO₃ product. Alternatively, all of the condensate could be withdrawn or distilled. Cooler-Condenser condensate can be the sole source of water for the Reactor, but some will have to be disposed of in one of the ways just mentioned when the condensate contains more water than required for Reactor operation. In addition, pure water may be fed to the Reactor (line 14), in which case, any condensate will be withdrawn, fed to another plant or distilled. When a Weak HNO₃ Distillation Column is not employed, and the Pressure Absorber contains the preferred scrubbing (upper) sections, it may be serviced with pure water instead of the usual distillate from the Weak HNO₃ Distillation Column. The resulting aqueous nitric acid effluent from such Absorber section may then be fed to the Reactor to serve as the source for part or all of the reaction water.

In a still further modification of the invention, when the nitrogen peroxide is supplied by an ammonia oxidation process and Cooler-Condenser and Separator designs give a condensate (stream 5) whose concentration is less than about 30% HNO₃, all of the bottoms from the Weak HNO₃ Distillation Column can be fed to Reactor to supply reaction water. Thus, there is only one product withdrawn from the system, i.e., the strong product containing about 90% HNO₃ or better, and there is no surplus condensate that must be disposed of. This embodiment is particularly useful where there is no on-site need for the weaker product, i.e., acid of less than azeotropic concentration.

In yet another modification the cooler-condensate is bleached, as in the case of the Reactor effluent acid, and the nitrogen peroxide thus recovered fed to the absorber along with Bleacher and Reactor offgas, while the bleached condensate is fed to the Weak HNO₃ Distillation Column for subsequent treatment as shown on the drawing.

The following Examples illustrate the processes of this invention. Examples 1 and 2 are experiments performed to obtain information required for Absorber and Reactor design, respectively. Example 3 illustrates operation of a plant embodying the process illustrated in FIG. I and whose design is based on, inter alia, data shown in Tables I to VI. Example 4 illustrates a preferred plant process according to FIG. II and also is based upon the aforementioned data.

EXAMPLE 1 — ABSORBER DESIGN

Aqueous solutions of HNO₃ containing 80% HNO₃ are prepared. NO₂ is dissolved in this 80% HNO₃ at a temperature of about 5°C. and the solutions are placed in stainless steel cylinders. The cylinders are pressurized with nitrogen to 100 psig ± 7 psig and maintained at 5°C. in a constant temperature bath until the gas and liquid phases reach equilibrium. This usually takes 4–5 hours. During this time, the cylinder is shaken at 30 minute intervals for a period of 1 minute. When equilibrium is obtained, the gas and liquid phases are separated and analyzed. The data in Table I show the results of the Experiments.

TABLE I

NO₂ Solubility in 80–82% HNO₃ (NO₂ Free Basis), 18–20% H₂O Solutions at T = 5°C.

| | | | Liquid Composition | | |
|---|---|---|---|---|---|
| Run No. | Total Pressure (psig) | Wt % NO₂ in Gas | Wt % HNO₃ (NO₂ free basis) | Wt % H₂O (NO₂ free basis) | Wt. % NO₂ (total wt basis) |
| 27 | 102 | 7.5 | 81.2 | 18.8 | 12.1 |
| 14 | 97 | 8.3 | 81.8 | 18.2 | 13.6 |
| 26 | 101 | 11.1 | 80.4 | 19.6 | 17.1 |
| 12 | 93 | 16.6 | 80.5 | 19.5 | 24.7 |

EXAMPLE 2 — REACTOR DESIGN

Aqueous solutions of $HNO_3$ containing about 80% $HNO_3$ are prepared. $NO_2$ is dissolved in the $HNO_3$ solutions, which are then pumped under pressure into the top of a reactor and flowed countercurrent to a stream of air. The reactor is a 3-inch-diameter vessel with five sieve plates spaced at 13-inch intervals. Liquid holdup volume on each plate is approximately 200 ml. The effects of the following variables are determined over the ranges indicated:

| | |
|---|---|
| $NO_2$ concentration in Feed Liquid | from 22 to 30% by weight |
| Reactor pressure | from 500 to 1500 psig |
| Reactor temperature | from 25 to 75°C. |
| $HNO_3$ concn. in feed liquid ($NO_2$ free basis) | from 78 to 85% by weight |
| $H_2O$ concn. in feed liquid | from 15 to 22% by weight |
| Liquid retention time in reactor | from 26 to 88 minutes |

The fraction (%) of $NO_2$ fed to the reactor which is converted to $HNO_3$ is determined by analyzing for $HNO_3$ in the feed and effluent liquid streams. The results are shown below in Tables II to VI.

TABLE II

Effect of $NO_2$ Concentration in Feed Liquid on $NO_2$ Conversion to $HNO_3$

Feed $HNO_3$ = 80% ($NO_2$ free basis)
Feed $H_2O$ = 20% ($NO_2$ free basis)
Pressure = 1480 psig
Liquid Retention Time = 80 to 100 minutes
Air Rate to Reactor = 120 cc/min measured at 1480 psig
Temperature = 75°C.

| Run No. | $NO_2$ Concentration in Feed Liquid (% by wt) | Conversion of $NO_2$ to $HNO_3$ |
|---|---|---|
| 16 | 22.6 | 62.7 |
| 50 | 30.4 | 62.5 |

TABLE III

Effect of Pressure on $NO_2$ Conversion to $HNO_3$

Feed $HNO_3$ = 80% ($NO_2$ free basis)
Feed $H_2O$ = 20% ($NO_2$ free basis)
Liquid Retention Time = 80 to 100 minutes
Air rate to Reactor = 120 cc/min measured at reactor pressure
Feed $NO_2$ = 29.5 to 30.5 (wt %)
Temperature = 75°C.

| Run No. | Reactor Pressure (psig) | Conversion of $NO_2$ $HNO_3$ (%) |
|---|---|---|
| 46 | 480 | 40.9 |
| 49 | 1000 | 56.8 |
| 50 | 1500 | 62.5 |

TABLE IV

Effect of Temperature on $NO_2$ Conversion to $HNO_3$

Feed $HNO_3$ = 80% ($NO_2$ free basis)
Feed $H_2O$ = 20% ($NO_2$ free basis)
Pressure = 1480 psig
Liquid Retention Time = 30 ± 5 minutes
Air Rate to Reactor = 115 to 150 cc/min measured at 1480 psig
Feed $NO_2$ = 22 to 24% by wt

| Run No. | Reactor Temp., °C. | Conversion of $NO_2$ $HNO_3$ (%) |
|---|---|---|
| 3 | 50 | 42.5 |
| 18 | 75 | 62.6 |

TABLE V

Effect of $HNO_3$ Concentration in Feed Solution on $NO_2$ Conversion to $HNO_3$ Pressure = 1475 psig
Liquid Retention Time = 90 to 100 min
Air Rate to Reactor = 120 cc/min measured at 1475 psig
Feed $NO_2$ = 29 ± 1% by wt
Temperature = 75°C.

| Run No. | $HNO_3$ Concentration in Feed Solution ($NO_2$ Free Basis) | Conversion of $NO_2$ to $HNO_3$ (%) |
|---|---|---|
| 44 | 78.0 | 68.1 |
| 43 | 84.6 | 52.7 |

TABLE VI

Effect of Liquid Retention Time on $NO_2$ Conversion to $HNO_3$

Feed $HNO_3$ = 79.5–80% ($NO_2$ free basis)
Feed $H_2O$ = 20–20.5% ($NO_2$ free basis)
Pressure = 1475 psig
Air Rate to Reactor = 120 cc/min measured at 1475 psig
Feed $NO_2$ = 24 to 29% by wt
Temperature = 75°C

| Run No. | Liquid Retention Time (min) | Conversion of $NO_2$ to $HNO_3$, % |
|---|---|---|
| 18 | 26 | 62.6 |
| 40 | 88 | 66.3 |

EXAMPLE 3 — PLANT DESIGN

The following table gives steady state operating conditions for a nitric acid plant designed to produce 394 tons/day 98% $HNO_3$ and 56 tons/day of 65% $HNO_3$. The plant is set up as shown in FIG. 1 and with correspondingly numbered flow lines. A standard ammonia oxidation unit employing platinum-containing catalyst is the source of nitrogen peroxide. The Absorber is 12.5 feet in inside diameter, 75 feet high, and contains a total of 60 refrigerant-cooled bubble cap trays spaced 1 foot apart. Fifty of the trays are in the bottom section and the remaining ten are in the upper section. All trays are of the type conventionally employed in pressure process nitric acid plants.

The Reactor is 10 feet in inside diameter, 50 feet high, and contains 40 bubble cap trays of the above type spaced 1 foot apart. The top ten trays are cooled to 35°C. The bottom trays are warmed to 60°C. and designed to provide a total holdup time of 60 minutes. Line 15 enters the Reactor between the tenth and eleventh trays (counting from the top) and line 14 enters above the top tray. The Reactor is heavy-walled to withstand its operating pressure of 1,500 psig.

The Bleacher is 5 feet in inside diameter, 9 feet high, and contains 4 sieve trays of conventional design spaced two feet apart.

Both the Weak and Strong $HNO_3$ Distillation Columns are of conventional design for operation at atmospheric pressure.

containing catalyst is the source of nitrogen peroxide. The Absorber is 12.5 ft. in inside diameter, 75 ft. high and contains a total of 60 refrigerant-cooled bubble cap trays.

The Reactor is 10 ft. in inside diameter, 65 ft. high and contains 55 bubble cap trays spaced 1 foot apart.

| Line Description | 1<br>$NH_3$<br>Feed | 2<br>Air<br>Feed | 3<br>Process<br>Gas from<br>Catalytic<br>Converter | 4<br>Process<br>Gas<br>to<br>Absorber | 5<br>Cooler-<br>Condenser<br>Condensate | 6<br>Bleacher<br>Offgas | 7<br>Reactor<br>Reactor<br>Offgas | 8<br>Total<br>Recycle<br>Gas |
|---|---|---|---|---|---|---|---|---|
| lb/hr | 10,819 | 165,169 | 175,988 | 149,840 | 26,149 | 39,512 | 32,776 | 72,288 |
| Temp, °C | 30 | 30 | 900 | 40 | 40 | 60 | 35 | 30 |
| Pressure, psig | 170 | 0 | 116 | 109 | 109 | 110 | 110 | 109 |
| Composition, lb/hr | | | | | | | | |
| $NH_3$ | 10,819 | — | — | — | — | — | — | — |
| $O_2$ | — | 38,309 | 13,360 | 2,709 | — | 7,946 | 2,530 | 10,476 |
| $N_2$ | — | 126,861 | 127,306 | 127,306 | — | 26,313 | 20,949 | 47,262 |
| NO | — | — | 18,138 | 659 | — | — | — | — |
| $NO_2, N_2O_4$ | — | — | — | 19,166 | — | 5,253 | 9,297 | 14,550 |
| $H_2O$ gas | — | — | 17,184 | — | — | — | — | — |
| $H_2O$ (liq) | — | — | — | — | 15,689 | — | — | — |
| $HNO_3$ (liq) | — | — | — | — | 10,460 | — | — | — |

| Line Description | 10<br>Absorber<br>Tailgas | 11<br>Total Weak<br>Distillation<br>Col Feed | 12<br>Acid<br>Recovery<br>Stream | 13<br>Weak $HNO_3$<br>Sidestream<br>Product | 14<br>Weak $HNO_3$<br>Feed to<br>Reactor | 15<br>Reactor<br>Feed<br>Solution | 16<br>Reactor<br>Product | 17<br>Bleached<br>Reactor<br>Product<br>Stream |
|---|---|---|---|---|---|---|---|---|
| lb/hr | 188,121 | 31,769 | 2,878 | 7,190 | 12,986 | 124,096 | 131,580 | 126,328 |
| Temp, °C | 20 | 50 | 40 | 35 | 35 | 10 | 60 | 60 |
| Pressure, psig | 102 | 0.5 | 0 | 0 | 1500 | 1500 | 1500 | 110 |
| Composition, lb/hr | | | | | | | | |
| $NH_3$ | — | — | — | — | — | — | — | — |
| $O_2$ | 13,185 | — | — | — | — | — | — | — |
| $N_2$ | 174,569 | — | — | — | — | — | — | — |
| NO | — | — | — | — | — | — | — | — |
| $NO_2, N_2O_4$ | 367 | — | — | — | — | 36,375 | 5,252 | — |
| $H_2O$ gas | — | — | — | — | — | — | — | — |
| $H_2O$ (liq) | — | 18,538 | 2,849 | 2,516 | 4,545 | 19,890 | 20,164 | 20,164 |
| $HNO_3$ (liq) | — | 13,231 | 29 | 4,674 | 8,441 | 67,831 | 106,164 | 106,164 |

| Line Description | 18<br>Recycle<br>$HNO_3$<br>Solvent | 19<br>Bleacher<br>Air | 20<br>Reactor<br>Air<br>Feed | 22<br>Waste<br>$HNO_3$ | 23<br>Strong<br>$HNO_3$<br>Product |
|---|---|---|---|---|---|
| lb/hr | 92,832 | 34,259 | 27,275 | 8,714 | 33,495 |
| Temp, °C | 35 | 65 | 60 | 40 | 40 |
| Pressure, psig | 105 | 112 | 1500 | 0 | 0 |
| Composition, lb/hr | | | | | |
| $NH_3$ | — | — | — | — | — |
| $O_2$ | — | 7,946 | 6,326 | — | — |
| $N_2$ | — | 26,313 | 20,949 | — | — |
| NO | — | — | — | — | — |
| $NO_2, N_2O_4$ | — | — | — | — | — |
| $H_2O$ gas | — | — | — | — | — |
| $H_2O$ (liq) | 19,494 | — | — | 8,627 | 670 |
| $HNO_3$ (liq) | 73,338 | — | — | 87 | 32,825 |

EXAMPLE 4 — PLANT DESIGN

The following Table gives steady state operating conditions for a nitric acid plant designed to produce 361 tons per day of 98% $HNO_3$ and 89 tons per day of 68% $HNO_3$. The plant is arranged as shown in FIG. 2 with the correspondingly numbered flow lines. A standard ammonia oxidation unit employing a platinum-containing catalyst is the source of nitrogen peroxide. The trays are warmed to 60°C. and designed to produce a total holdup time in the range 60–120 minutes. Line 29 enters the top of the Reactor above the top tray. The Reactor is heavy walled to withstand its operating pressure of 500 psig. Both the Flashers and the Weak and Strong $HNO_3$ Distillation Columns are of conventional design for operation at atmospheric pressure.

| Line Description | 1<br>$NH_3$ Feed | 2<br>Air Feed | 3<br>Process<br>Gas from<br>Catalytic<br>Converter | 4<br>Process<br>Gas<br>to<br>Absorber | 5<br>Cooler-<br>Condenser<br>Condensate | 26<br>Vapor From<br>Partial Con-<br>denser and<br>Separator | 27<br>Weak $HNO_3$<br>Distillation<br>Column<br>Feed | 7<br>Reac-<br>tor<br>Off<br>Gas |
|---|---|---|---|---|---|---|---|---|
| lb/hr | 10,883 | 155,714 | 166,598 | 137,507 | 29,091 | 1,374 | 28,285 | 27,839 |
| Temp., °C. | 30 | 30 | 350 | 60 | 60 | 100 | 100 | 60 |
| Pressure, psig | 170 | 0 | 125 | 120 | 120 | 0 | 0 | 121 |
| Composition, lb/hr | | | | | | | | |
| $NH_3$ | 10,883 | | | | | | | |
| $O_2$ | | 35,633 | 10,538 | 3,328 | | | | 2,340 |

—Continued

| Line | 1 | 2 | 3 | 4 | 5 | 26 | 27 | 7 |
|---|---|---|---|---|---|---|---|---|
| Description | NH₃ Feed | Air Feed | Process Gas from Catalytic Converter | Process Gas to Absorber | Cooler-Condenser Condensate | Vapor From Partial Condenser and Separator | Weak HNO₃ Distillation Column Feed | Reactor Off Gas |
| N₂ |  | 117,331 | 117,780 | 117,780 |  |  |  | 19,264 |
| NO |  |  | 18,245 | 7,473 |  | 2 |  |  |
| NO₂, N₂O₄ |  |  |  | 7,639 | 457 | 457 |  | 6,235 |
| H₂O gas |  | 2,750 | 20,035 | 1,287 |  | 915 |  |  |
| H₂O (liq) |  |  |  |  | 17,100 |  | 16,744 |  |
| HNO₃ (liq) |  |  |  |  | 11,534 |  | 11,541 |  |

| Line | 10 | 13 | 14 | 28 | 29 | 16 |
|---|---|---|---|---|---|---|
| Description | Pressure Absorber Off Gas | Weak HNO₃ Sidestream Product | Weak HNO₃ Feed to Reactor | Atmospheric Absorber Bottoms | Reactor Feed Solution | Reactor Product |
| lb/hr | 139,420 | 10,906 | 6,041 | 29,401 | 147,572 | 145,067 |
| Temp. °C | 5 | 35 | 35 | 5 | 5 | 60 |
| Pressure, psig | 110 | 0 | 120 | 120 | 500 | 500 |
| Composition, lb/hr |  |  |  |  |  |  |
| NH₃ |  |  |  |  |  |  |
| O₂ | 1,859 |  |  |  |  |  |
| N₂ | 137,043 |  |  |  |  |  |
| NO |  |  |  |  |  |  |
| NO₂, N₂O₄ | 353 |  |  | 7,646 | 33,638 | 7,220 |
| H₂O gas | 9 |  |  |  |  |  |
| H₂O (liq) |  | 3,490 | 1,933 | 4,466 | 25,117 | 21,389 |
| HNO₃ (liq) |  | 7,416 | 4,108 | 17,289 | 88,817 | 116,458 |
| HNO₃ (gas) | 156 |  |  |  |  |  |

| Line | 18 | 35 | 36 | 20 | 22 | 37 | 32 | 40 | 34 |
|---|---|---|---|---|---|---|---|---|---|
| Description | Recycle HNO₃ Solvent to Pressure Absorber | Recycle HNO₃ Solvent to the Atmospheric Absorber | Off Gas from Atmospheric Absorber | Reactor Air Feed | Waste HNO₃ | Feed to Strong HNO₃ Flasher | Vapor from Strong HNO₃ Flasher | Vapor from Strong HNO₃ Partial Condenser | Strong HNO₃ Product |
| lb/hr | 86,205 | 17,741 | 93 | 25,334 | 10,768 | 145,068 | 4,958 | 5,418 | 30,744 |
| Temp., °C | 5 | 5 | 5 | 80 | 100 | 60 | 74 | 90 | 40 |
| Pressure, psig | 120 | 0 | 0 | 500 | 0 | 0 | 0 | 0 | 0 |
| Composition, lb/hr |  |  |  |  |  |  |  |  |  |
| NH₃ |  |  |  |  |  |  |  |  |  |
| O₂ |  |  | 16 | 5,850 |  |  |  | 14 |  |
| N₂ |  |  |  | 19,263 |  |  |  |  |  |
| NO |  |  |  |  |  |  |  |  |  |
| NO₂, N₂O₄ |  |  | 77 |  |  | 7,220 | 3,016 | 4,240 | 46 |
| H₂O gas |  |  |  | 221 |  |  |  | 2 |  |
| H₂O (liq) | 17,241 | 3,548 |  |  | 10,763 | 21,389 |  |  | 614 |
| HNO₃ (liq) | 68,964 | 14,193 |  |  | 5 | 116,458 | 1,942 |  | 30,084 |
| HNO₃ (gas) |  |  |  |  |  |  |  | 1,162 |  |

What is claimed is:

1. A process for producing strong nitric acid having a concentration of at least about 90% HNO₃ which comprise continuously:

a. countercurrently absorbing gaseous nitrogen peroxide in aqueous nitric acid bottoms from step (e) at a temperature and pressure of about from 0° to 15°C. and 80 to 120 psig, respectively, thereby forming a true solution of aqueous nitric acid having a concentration of about from 75 to 85% HNO₃ on a nitrogen peroxide free basis and about from 15 to 30% dissolved nitrogen peroxide, based on the total weight of the solution;

b. reacting the true solution of step (a) with molecular oxygen and water at a temperature in the range of about 40° to 100°C. and a pressure in the range of about 300 to 1,600 psig, thereby increasing the concentration of the aqueous nitric acid of step (a) to a higher concentration of about 80 to 90% HNO₃ in the form of an aqueous HNO₃ bottoms stream, while recovering gaseous nitrogen peroxide desorbed from the true solution during the reaction and recycling the gaseous peroxide to be absorbed in step (a);

c. vaporizing a portion of the aqueous nitric acid stream from step (b) to remove at least 50% nitrogen peroxide contained therein; and d. absorbing the nitrogen peroxide obtained in step (c) in a portion of the bottoms from step (e); and e. distilling the aqueous nitric acid from step (c) at about atmospheric pressure and recovering as distillate strong nitric acid having a concentration of about from 90 to 100% HNO₃, leaving as bottoms aqueous nitric acid having a concentration of about from 75 to 85% HNO₃.

2. A process of claim 1 wherein the water required in step (b) is supplied by aqueous nitric acid having a concentration below about 68.5% HNO₃.

3. A process of claim 2 wherein the aqueous nitric acid supplied to step (b) first absorbs some of the nitrogen peroxide desorbed in step (b), the remaining desorbed NO₂ being recycled to step (a), and thereafter joins said true solution for combined flow countercurrently to a stream of gas containing molecular oxygen.

4. A process of claim 1 wherein step (b) comprises reacting the true solution with the molecular oxygen in air flowing countercurrently to said solution.

5. A process of claim 1 wherein step (c) is accomplished by flashing about 1–10% by weight of the aqueous nitric acid reaction product of step (b).

6. A process of claim 1 which additionally comprises continuously:
   g. scrubbing the gaseous effluents from absorption step (a) with water to recover unabsorbed gaseous nitrogen peroxide and $HNO_3$ vapor as weak nitric acid; and
   h. distilling the weak nitric acid from step (g) to give as distillate aqueous nitric acid having a concentration below about 5% $HNO_3$ and as bottoms aqueous nitric acid having a concentration of about from 55 to 68% $HNO_3$.

7. A process of claim 1 wherein the initial source of nitrogen peroxide for step (a) is a substantially anhydrous gaseous mixture which is prepared by catalytically oxidizing ammonia with the molecular oxygen in air, cooling the resulting gases to condense water of reaction and oxidize nitric oxide to nitrogen peroxide, and separating water of reaction as weak aqueous nitric acid condensate having a concentration less than bout 55% $HNO_3$, and which additionally comprises continuously:
   h. distilling such aqueous nitric acid condensate having a concentration of less than about 55% $HNO_3$ to give as distillate aqueous nitric acid having a concentration below about 5% $HNO_3$ and as bottoms aqueous nitric acid having a concentration of about from 55 to 68% $HNO_3$.

8. The process of claim 7 which additionally comprises continuously
   i. feeding at least a portion of the bottoms from step (h) to step (b) to serve as a source of said water.

9. a process of claim 8 which additionally comprises
   j. feeding at least a portion of the distillate from step (h) to step (g) to serve as a source of said water.

10. A process of claim 1 in which the absorption of step (d) is preformed at substantially atmospheric pressure.

11. A process of claim 10 in which the vaporizing of step (c) is performed by depressurizing the aqueous $HNO_3$ bottoms stream of step (b) to substantially atmospheric pressure.

12. A process of claim 11 which comprises additionally heating the depressurized stream, and again depressurizing the stream to remove substantially all the remaining dissolved nitrogen peroxide.

13. A process of claim 1 wherein the initial source of nitrogen peroxide for step (a) is a substantially anhydrous gaseous mixture which is prepared by catalytically oxidizing ammonia with the molecular oxygen in air, cooling the resulting gases to condense water of reaction and oxidize nitric oxide to nitrogen peroxide, and separating water of reaction as weak aqueous nitric acid condensate having a concentration less than about 55% $HNO_3$, wherein the absorption of step (d) is performed at substantially atmospheric pressure, and which additionally comprises continuously:
   g. scrubbing the gaseous effluents from absorption step (a) with water to recover unabsorbed gaseous nitrogen peroxide and $HNO_3$ vapor as weak nitric acid;
   h. distilling the weak nitric acid from step (g) and the aqueous nitric acid condensate having a concentration of less than about 55% $HNO_3$ to give as distillate aqueous nitric acid having a concentration below about 5% $HNO_3$ and as bottoms aqueous nitric acid having a concentration of about from 55 to 68% $HNO_3$.
   i. feeding at least a portion of the bottoms from step (h) to step (b) to serve as a source of said water; and
   j. feeding at least a portion of the distillate from step (h) to step (g) to serve as a source of said water.

14. A process of claim 1 wherein the vaporizing of step (c) is done by depressurizing the aqueous nitric acid from step (h) to about 105 to 155 psig and bleaching such depressurized acid at a temperature and pressure of about from 30° to 90°C. and 105 to 155 psig, respectively, to recover substantially the remaining nitrogen peroxide dissolved in the aqueous nitric acid of step (b).

15. A process of producing strong nitric acid having a concentration of at least about 90% $HNO_3$ which comprises continuously:
   a. countercurrently absorbing gaseous nitrogen peroxide in agueous nitric acid bottoms from step (f) at a temperature and pressure of about from 0° to 15°C. and 80 to 120 psig, respectively, thereby forming a true solution of aqueous nitric acid having a concentration of about from 75 to 85% $HNO_3$ and about from 15 to 30% dissolved nitrogen peroxide, based on the total weight of the solution, wherein the initial source of nitrogen peroxide is a substantially anhydrous gaseous mixture which is prepared by catalytically oxidizing ammonia with the molecular oxygen in air, cooling the resulting gases to condense water of reaction and oxidize nitric oxide to nitrogen peroxide, and separating water of reaction as weak aqueous nitric acid condensate having a concentration less than about 55% $HNO_3$;
   b. reacting the true solution of step (a) with molecular oxygen and water at a temperature and pressure of about from 40° to 100°C. and 300 to 1,600 psig, respectively, thereby increasing the concentration of the aqueous nitric acid of step (a) to a higher concentration of about from 80 to 90% $HNO_3$, while recovering gaseous nitrogen peroxide desorbed from the true solution during the reaction;
   c. depressurizing the aqueous nitric acid from step (b) to about from 105 to 155 psig;
   d. bleaching the depressurized acid of step (c) at a temperature and pressure of about from 30° to 90°C. and 105 to 155 psig, respectively, to recover substantially the remaining nitrogen peroxide dissolved in the aqueous nitric acid of step (b);
   e. recycling the nitrogen peroxide recovered in steps (b) and (d) to step (a) for admixture with fresh nitrogen peroxide and absorption in said bottoms; and
   f. distilling the bleached aqueous $HNO_3$ from step (d) at about atmospheric pressure and recovering as distillate strong nitric acid having a concentration of about from 90 to 100% $HNO_3$, leaving as bottoms aqueous nitric acid having a concentration of about from 75 to 85% $HNO_3$, respectively;

g. scrubbing the gaseous effluent from absorption step (a) with water to recover unabsorbed gaseous nitrogen peroxide and $HNO_3$ vapor as weak nitric acid:

h. distilling the weak acid from step (g) and the aqueous nitric acid condensate having a concentration below about 5% $HNO_3$ and as bottoms aqueous nitric acid having a concentration of about from 55 to 68%.

i. feeding at least a portion of the bottoms from step (h) to step (b) to serve as the source of said water; and j. feeding at least a portion of the distillate from step (h) to step (g) to serve as a source of said water.

* * * * *